United States Patent
Park et al.

(10) Patent No.: US 9,712,042 B2
(45) Date of Patent: Jul. 18, 2017

(54) BYPASS APPARATUS FOR CONVERTER

(71) Applicant: HYOSUNG CORPORATION, Seoul (KR)

(72) Inventors: Jung Soo Park, Seongnam-si (KR); Hang Jun Yang, Seoul (KR); Jong Yun Choi, Hwaseong-si (KR)

(73) Assignee: HYOSUNG CORPORATION, Mapo-gu, Seoul (KR)

( * ) Notice: Subject to any disclaimer, the term of this patent is extended or adjusted under 35 U.S.C. 154(b) by 26 days.

(21) Appl. No.: 14/758,022

(22) PCT Filed: Dec. 27, 2013

(86) PCT No.: PCT/KR2013/012337
§ 371 (c)(1),
(2) Date: Jun. 26, 2015

(87) PCT Pub. No.: WO2014/104831
PCT Pub. Date: Jul. 3, 2014

(65) Prior Publication Data
US 2016/0197547 A1    Jul. 7, 2016

(30) Foreign Application Priority Data
Dec. 27, 2012  (KR) .................. 10-2012-0154668

(51) Int. Cl.
*H02M 1/32*       (2007.01)
*H02M 7/483*      (2007.01)
*H01H 33/666*     (2006.01)

(52) U.S. Cl.
CPC .......... *H02M 1/32* (2013.01); *H01H 33/6662* (2013.01); *H02M 7/483* (2013.01);
(Continued)

(58) Field of Classification Search
CPC ....... H02M 2001/0048; H02M 1/0061; H02M 1/32; H02M 2001/325; H02M 7/483; H02M 2007/4835; H01H 33/6662; H02H 7/122
See application file for complete search history.

(56) References Cited

U.S. PATENT DOCUMENTS

2006/0007623 A1* 1/2006 Trivette ............... H01H 47/325
361/115
2006/0139135 A1* 6/2006 Kampf ............... H01H 33/6662
335/229
(Continued)

FOREIGN PATENT DOCUMENTS

JP       EP 1005058 A2 *  5/2000  ........... H01H 33/666
JP       2000-164084 A    6/2000
(Continued)

*Primary Examiner* — Fred E Finch, III
(74) *Attorney, Agent, or Firm* — Novick, Kim & Lee, PLLC; Jae Youn Kim

(57) ABSTRACT

The present invention provides an apparatus for bypassing a phase current from a malfunctioning sub module in a converter. The converter includes multiple sub modules each having an energy storage unit, and at least one power semiconductor circuit which is connected in parallel to the energy storage unit and which includes a power semiconductor switch and free-wheeling diodes, wherein the sub modules are connected in series to each other. The bypass apparatus for a converter according to the present invention comprises: a vacuum switch tube for disconnecting between a first connection terminal and a second connection terminal of a malfunctioning sub module upon the occurrence of a malfunction in a specific sub module and bypassing a phase current from said malfunctioning sub module; and a control device for controlling the operation of the vacuum switch tube.

4 Claims, 4 Drawing Sheets

(52) U.S. Cl.
 CPC ............ *H02M 2001/325* (2013.01); *H02M 2007/4835* (2013.01)

(56) References Cited

U.S. PATENT DOCUMENTS

2010/0118453 A1\* 5/2010 Dorn .................. H01H 79/00
 361/54
2015/0333660 A1\* 11/2015 Kim .................... H02M 7/483
 363/123

FOREIGN PATENT DOCUMENTS

| JP | 2004-524796 A | 8/2004 |
| JP | 2010-524426 A | 7/2010 |
| JP | 2012-147613 A | 8/2012 |
| WO | 2008125494 A1 | 10/2008 |

\* cited by examiner

BYPASS APPARATUS FOR CONVERTER

TECHNICAL FIELD

The present invention relates, in general, to converter protection and, more particularly, to a bypassing device for a converter enabling normal operation of a converter only with a remaining normal sub-module by bypassing phase current from a sub-module in which failure occurs, when the failure occurs in the sub-module of the converter in which a plurality of sub-modules are connected in series, each of which includes an energy storage unit and a power semiconductor circuit connected in parallel to the energy storage unit.

BACKGROUND ART

For a high voltage direct current converter, a power semiconductor capable of controlling a turn-off is used for bidirectional conversion of AC voltage and DC current. Since the maximum voltage that a power semiconductor can withstand is limited, a plurality of semiconductor modules having power semiconductor circuits have to be connected in series for high voltage processing. In order to configure a power semiconductor circuit, various semiconductor modules may be connected to each other.

As is known, a known modular multilevel converter (MMC) includes a plurality of sub-modules in which such a power semiconductor circuit forms two output terminals and the plurality of sub-modules are connected in series. Such a sub-module may include, for example, an energy storage unit and a power semiconductor circuit formed of a plurality of power semiconductor switches and free wheel diodes.

FIG. 1 illustrates such a known MMC converter. A corresponding converter is configured to have one or more phase modules 1, in which a plurality of sub-modules 10 are connected in series. As a load connecting terminal, AC voltage side terminals L1, L2, and L3 may be connected to a three-phase load, for example, a three-phase power system.

FIG. 2 illustrates an example of equivalent circuits of the sub-modules 10. Each of the sub-modules 10 may include an energy storage unit 11, power semiconductor switches 12 and 13, which are connected to the energy storage unit 11 in parallel and capable of controlling a turn-off, and at least one power semiconductor circuit 16 including free wheel diodes 14 and 15. Each of the sub-modules 10 may be implemented to have various configurations featuring different arrangements of the energy storage unit 11 and the at least one power semiconductor circuit 16. Each of the sub-modules 10 includes first and second connecting terminals X1 and X2.

In addition, when a failure occurs in a specific sub-module 10 in the MMC converter, the sub-module 10 in which the failure occurred is short-circuited in order to prevent an open circuit of a phase module 1. Due to the short circuit, phase current is bypassed from the failed sub-module 10 to enable the phase module 1 to be normally operated by another normal sub-module 10. As a short circuit for shorting the sub-module 10, for example, a vacuum interrupter tube 100 is provided. The vacuum interrupter tube 100 may be controlled by a control unit (not illustrated) to be shorted within several msec after failure occurs. Accordingly, in normal operation, normal current flows through the power semiconductor circuit 16 of the sub-module 10, but at the time of failure in the specific sub-module 10, the vacuum interrupter tube 100 of the failed sub-module 10 is shorted and the phase current is bypassed through the vacuum interrupter tube 100 to protect the phase module 1.

FIG. 3 is a cross-sectional view of the vacuum interrupter tube 100, and FIG. 4 is a side view of a control device for controlling the operation of the vacuum interrupter tube 100 of FIG. 3. The inside of the vacuum interrupter tube 100 is maintained in a vacuum state by a vacuum sealed container. A fixed contactor 101 is built into a fixed contact bolt 111 and a moveable contactor 102 is built into a movable contact bolt 112. In addition, first and second output terminals X1 and X2 are respectively connected to the fixed contact bolt 111 and the movable contact bolt 112. Accordingly, a short circuit is formed or released by contact or separation of the fixed contactor 101 and the movable contactor 102. Holding power 200 occurs in the movable contact bolt 112 in a vertical direction due to the pressure difference between the inside and the outside of the vacuum interrupter tube 100 in order to enable the movable contactor 102 to move toward the fixed contactor 101. Such holding power 200 is supported by a spring operation of an internal metal bellows 120 and an air pressure difference between the inside and outside of the vacuum interrupter tube 100. Accordingly, power 240 applied in an opposite direction to the holding power 200 is necessary in order to release the short circuit in the vacuum interrupter tube 100. This opposite power 240 is provided by the control device 300.

In an operation process, there is an interval 335 between a core contactor 310 and the soft magnetic core 320 of the control device 300. At the time of normal operation, power is applied to a coil 340 wound around the core 320, the core 320 operates as an electromagnet to attract the core contactor 310, and the movable contact bolt 112 connected to the core contactor 310 is interlocked to separate the fixed contactor 101 from the movable contactor 102. Accordingly, a gap 150 is created between the fixed contactor 101 and the movable contactor 102 to release the short circuit. At the time of the occurrence of failure, the power supply to the coil 340 is cut off, and the fixed contactor 101 and the movable contactor 102 are brought into contact with each other by the foregoing power 200 to form a short circuit.

However, for the typical control device 300, at the time of normal operation, power is continuously supplied to the coil 340 for releasing the short circuit of the vacuum interrupter tube 100, which causes power loss. In addition, when the converter is in a power failure state, power may not be supplied to the coil 340, and in this case, it is not possible to release the short circuit of the fixed contactor 101 and the moveable contactor 102, and accordingly there is no method for supplying power to the converter through the AC voltage side terminals L1, L2, and L3, or DC voltage side terminals P and N to operate the converter.

DISCLOSURE

Technical Problem

Accordingly, the present invention has been made keeping in mind the above problems occurring in the prior art, and an object of the present invention is to provide a bypassing device for a converter, which is capable of minimizing power loss for a control device of a vacuum interrupter tube provided for short-circuiting a sub-module in a converter in which a plurality of sub-modules are connected in series.

Another object of the present invention is to provide a bypassing device for a converter, which is capable of enabling power to be applied only at the time of a shorting operation and of maintaining a short circuit release state in a power failure state for a control device of the foregoing vacuum interrupter tube.

Technical Solution

In order to accomplish the above objects, the present invention provides a bypassing device in a converter including an energy storage unit and a plurality of sub-modules (10) including at least one power semiconductor circuit connected to the energy storage unit in parallel and including a plurality of power semiconductor switches and free wheel diodes. The bypassing device includes: a vacuum interrupter tube, shorting a first connection terminal and a second connection terminal of a sub-module in which failure occurs and bypassing a phase current from the sub-module in which the failure occurs when the failure occurs in the specific sub-module; and a control device controlling the operation of the vacuum interrupter tube, wherein the control device includes a permanent magnet that has different polarities and guides a short or a short release of the vacuum interrupter tube, a core fixedly installed to allow the permanent magnet to contact/be separated, a coil wound on the core, a power source unit supplying power to the coil, and a control unit controlling power to be supplied from the power source unit to the coil at the time of occurrence of the failure in the sub-module, wherein the control unit controls the power source unit to allow power to be supplied to the coil at the time of occurrence of the failure in the sub-module and to push out the permanent magnet with magnetism induced to the core to guide the short of the vacuum interrupter tube to bypass the phase current.

In the present invention, the control unit may perform control to cut off supplying power to the coil to maintain the state in which the permanent magnet contacts the core.

In the present invention, both end portions of the core and the permanent magnet corresponding thereto may have identical polarity.

In the present invention, the coil is wound multiple times on the core in a direction such that polarities of the end portions of the core and the permanent magnet are identical.

In the present invention, the short of the vacuum interrupter tube may be maintained after the supply of power to the coil is cut off.

In the present invention, a constant interval may be maintained so that the permanent magnet does not contact the core after the supply of power to the coil is cut off.

Advantageous Effects

According to the present invention, power loss can be minimized in a converter in which a plurality of sub-modules are connected in series, since power is supplied to a control device of a vacuum interrupter tube only at the time of the occurrence of failure in order to short a sub-module and accordingly, the supply of power is not necessary in a normal state and after bypass of the phase current.

In addition, according to the present invention, since a short release state can be maintained even when the converter is in the normal state, it is possible to supply power through an AC or DC terminal to operate a converter.

BEST MODE

Figure 1:
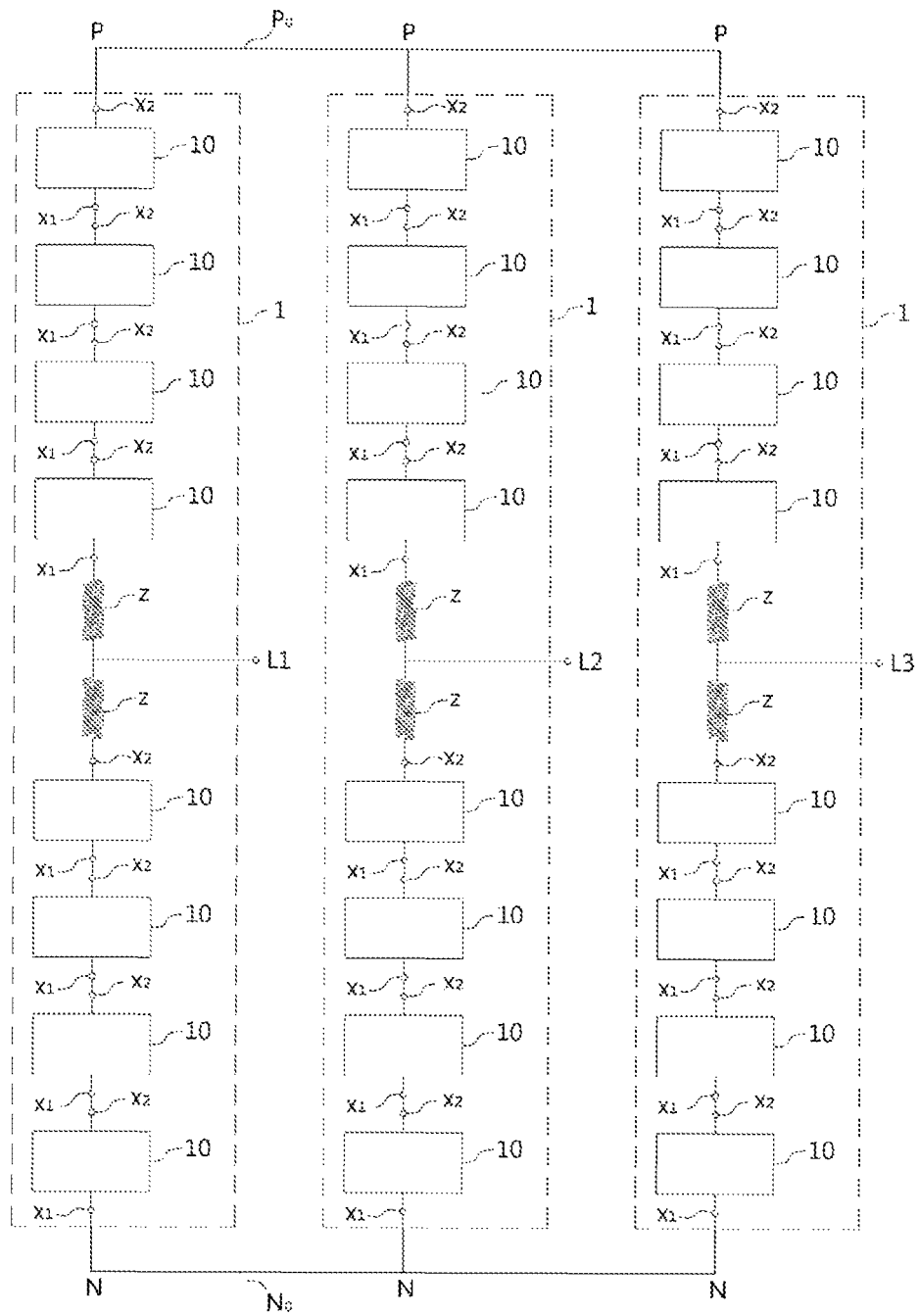
FIG. 1 is an equivalent circuit diagram showing a typical known converter.
Figure 2:
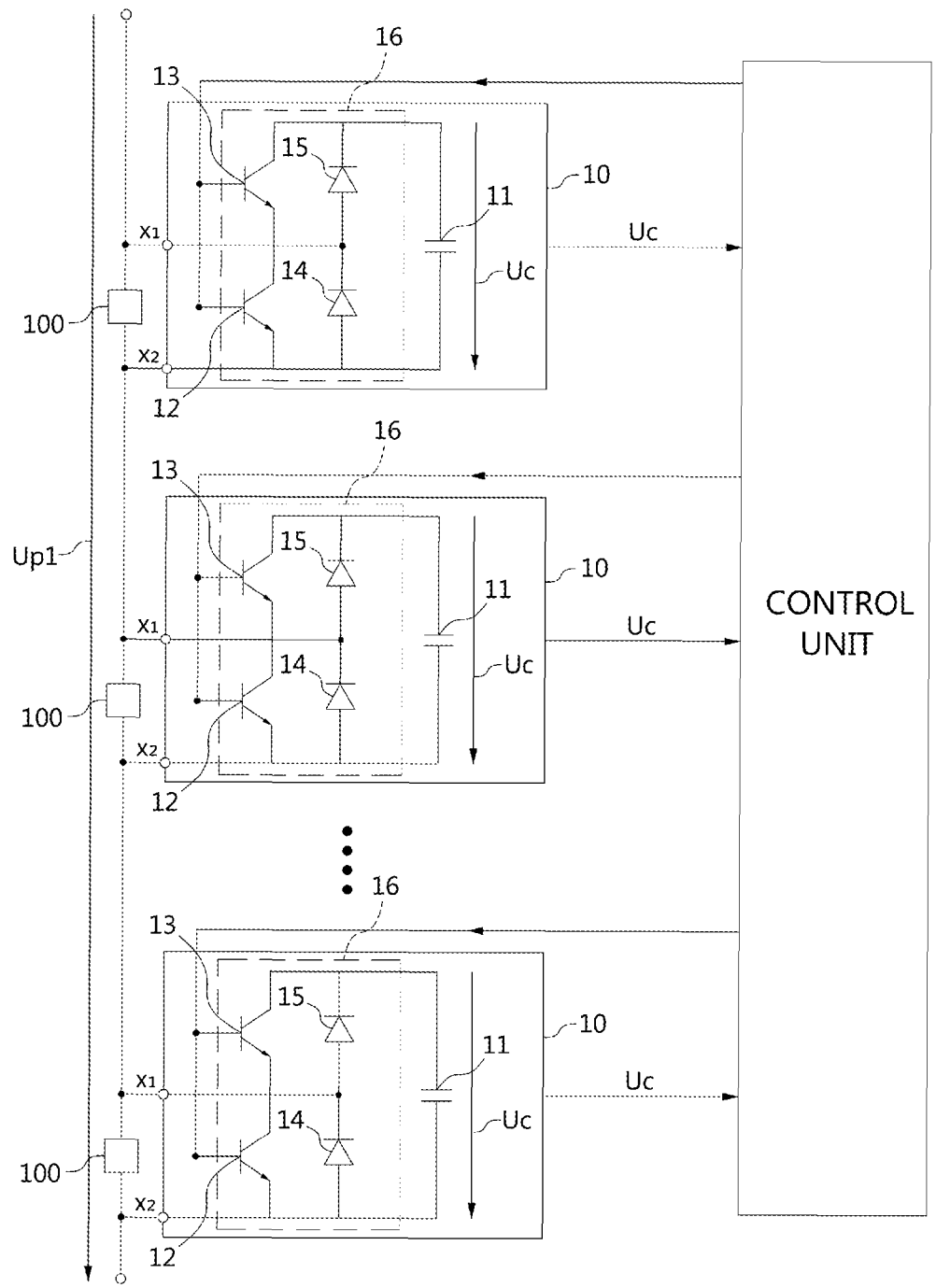
FIG. 2 is an equivalent circuit diagram of the sub-module in the converter of FIG. 1.
Figure 3:
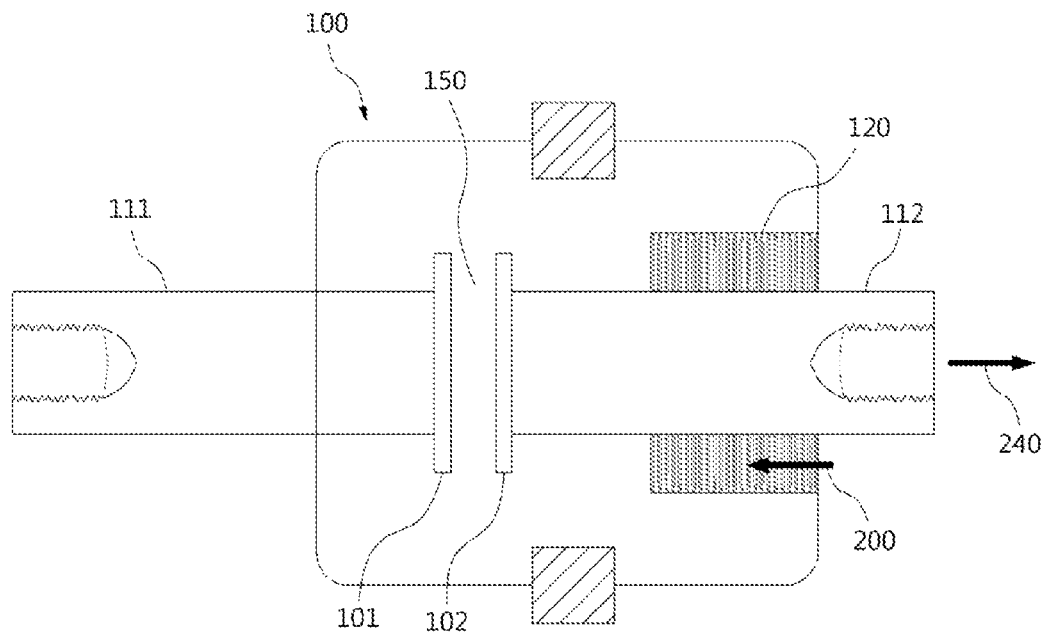
FIG. 3 is a cross-sectional view of the vacuum interrupter tube in the converter of FIG. 1.
Figure 4:
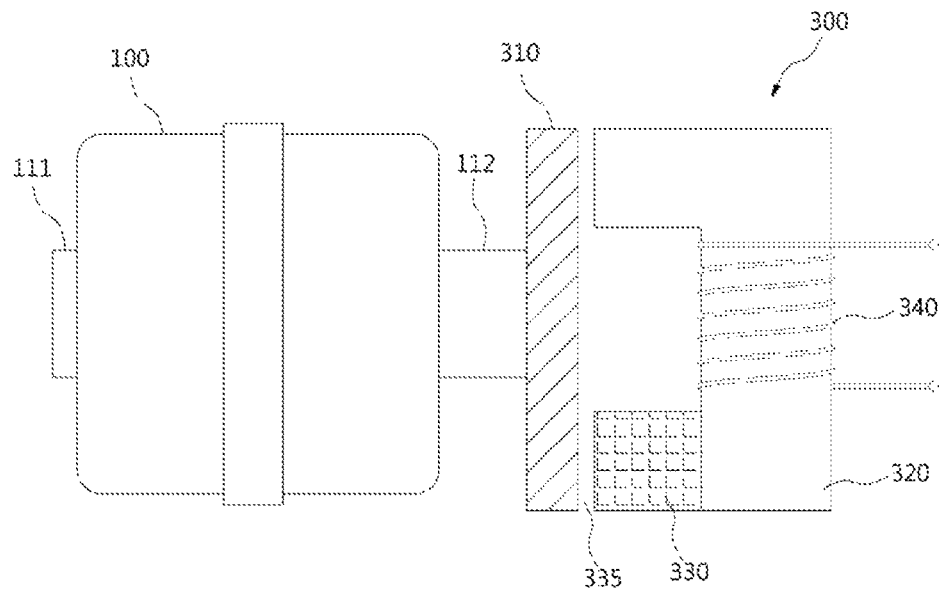
FIG. 4 is a side view of the control device for controlling the operation of the vacuum interrupter tube of FIG. 3.

Reference should now be made to the drawings, in which the same reference numerals are used throughout the different drawings to designate the same or similar components.

Hereinafter, embodiments of the present invention will be described in detail with reference to the accompanying drawings. In the following description, detailed descriptions of well-known functions or constructions will be omitted since they would obscure the invention in unnecessary detail.

A bypassing device for a converter according to the present invention may be applied to a power converting converter in which a plurality of sub-modules are serially connected. When failure occurs in a sub-module, phase current is bypassed outside the failed sub-module in order to prevent the overall operation of the converter to be stopped due to an open circuit of the phase module 1.

From a close look to an equivalent circuit of the converter, the phase module connects a DC voltage side to positive and negative DC voltage buses PO and NO. There is a DC voltage, not illustrated, between the DC voltage buses PO and NO. Each of the phase modules includes one intermediate AC voltage terminal and two external DC voltage terminals. One phase module arm is formed between the intermediate AC voltage terminal and each of the external DC voltage terminals, and the phase module arm becomes a serial circuit of the sub-module. Each sub-module includes a unique capacitor, which is an energy storage unit, and the capacitor is connected to a power semiconductor circuit in parallel. The power semiconductor circuit includes a turn-off controllable power semiconductor, and the turn-off control power semiconductor is connected in anti-parallel to a free wheel diode. Accordingly, the turn-off controllable power semiconductor and the free wheel diode built therein configure one power semiconductor circuit. In addition, a plurality of power semiconductor circuits contact each other to configure a so-called half or full bridge circuit, and accordingly one of a capacitor voltage, zero voltage or polarity-inverted capacitor voltage appears at both output terminals of each sub-module. Such a converter is called a modular multilevel converter (MMC).

In such an MMC, a plurality of sub-modules are connected in series, each of which includes a distributed energy storage unit (i.e. capacitor) and at least one power semiconductor module circuit, which is connected to the energy storage unit in parallel and includes a plurality of power semiconductor switches and free wheel diodes. In addition, as an output terminal of the sub-module, first and second output terminals are formed.

In the MMC, when a failure occurs in a specific sub-module, an open circuit is formed between the first and second output terminals in most cases. Accordingly, due to the failure in individual sub-modules, the operation of the phase module 1 or the entire converter system is not possible. In order to overcome this problem, the failed sub-module is shorted. For this short-circuit, a short device is connected in parallel to the sub-module. In detail, the entire converter is protected by connecting the short circuit between two output terminals of the sub-module and shorting the two output terminals to enable normal operation of the remaining sub-modules when a failure occurs in a corresponding sub-module.

As described above, when a failure occurs in each sub-module, shorting has to be performed within several msec after the occurrence of failure in order to maintain normal operation of the sub-module. A known vacuum interrupter tube is used as a short device for bypassing the phase current. Such a vacuum interrupter tube is installed in each sub-module in parallel to be connected between two output terminals X1 and X2 of each sub-module. During normal operation, the phase current is allowed to flow through the sub-module, and the vacuum interrupter tube is allowed to be shorted through the vacuum interrupter tube at the time of failure of the specific sub-module. The short in the vacuum interrupter tube is executed by a control device according to the present invention.

Figure 5:
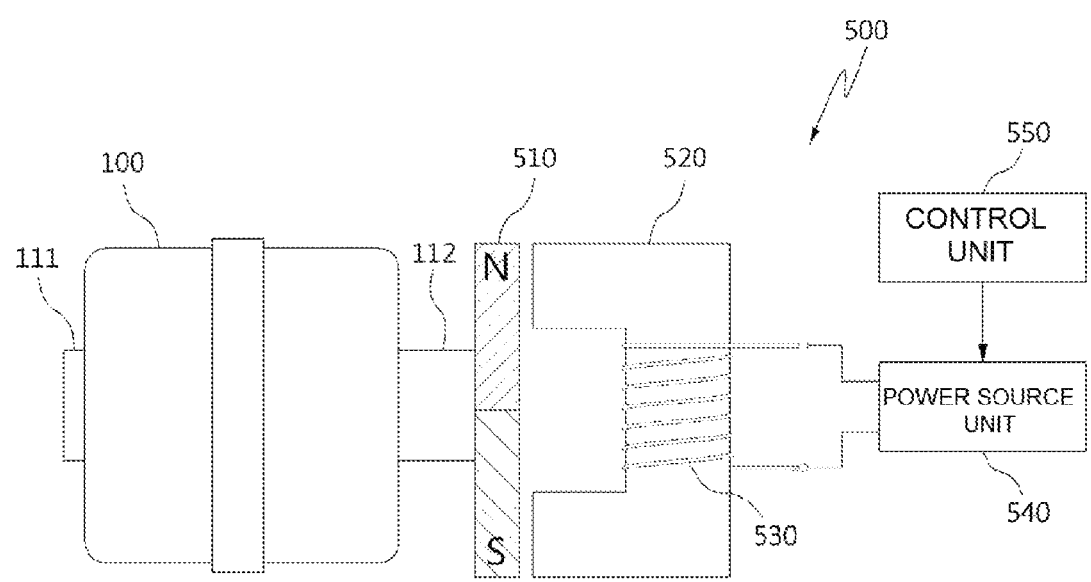
FIG. 5 is a side view of a control device for controlling the operation of the vacuum interrupter tube according to an embodiment of the present invention.

FIG. 5 is a side view of a control device for controlling the operation of the vacuum interrupter tube according to an embodiment of the present invention.

Referring to FIG. 5, a control device 500 of a vacuum interrupter tube according to the present invention includes a permanent magnet 510 having opposite polarities at respective end terminals and guiding the short or short release of the vacuum interrupter tube 100. In other words, both sides thereof from the center have N and S polarities. In addition, the permanent magnet 510 is connected to the movable contact bolt 112, which is inserted into the vacuum interrupter tube 100. Accordingly, the movable contact bolt 112 is interlocked to the permanent magnet 510 and moves according to the movement of the permanent magnet 510, and then the short or release of the short is performed in the vacuum interrupter tube 100.

Accordingly, the control device 500 of the vacuum interrupter tube according to the present invention includes a soft magnetic core 520. This core 520 may be fixedly installed. The permanent magnet 510 contacts the core 520 with its own magnetic force at ordinary times or during normal operation. In this way, the short release occurs when the movable contact bolt 112 of the vacuum interrupter tube 100, which is connected to the permanent magnet 510, moves toward the core 520 and is separated from the internal fixed contact bolt by allowing the permanent magnet 510 to contact the core 520. Accordingly, during the normal operation, the permanent magnet 510 moves toward the core 520 to contact the core 520 for the short release in the vacuum interrupter tube 100.

The coil 530 is wound multiple times around the core 520. This coil 530 serves to form an electromagnet by inducing magnetism to the core 520 through the application of power. At this point, the polarity of magnetism induced at both ends of the core 520 may be determined according to the winding direction and current direction of the coil 530.

In addition, the control device 500 of the vacuum interrupter tube according to the present invention includes a power source unit 540 for applying power to the coil 530. The power unit 540 applies power to the coil 530 under the control of the control unit 550, which will be described later. Through the power application, the electromagnet is realized by inducing magnetism to the core 520.

In addition, the control device 500 of the vacuum interrupter tube includes a control unit 550, which performs control so that the power unit 540 supplies power and cuts off power. The control unit 550 determines normal operation or the occurrence of failure, and according to the determination result, determines whether to supply power or stop the supply of power to the coil 530 for shorting and releasing a short in the vacuum interrupter tube 100.

A description will be provided of the process for operating the control device of the vacuum interrupter tube configured in this way according to the present invention.

The control unit 550 maintains the cut-off state of the supply of power to the coil 530 during normal operation of the converter. In this case, since no magnetism is generated in the core 520, the permanent magnet 510 remains in contact with the core 520 due to the magnetic force thereof. According to such contact, the movable contact bolt 112 connected to the permanent magnet 510 also moves toward the core 520, and is separated from the fixed contact bolt 111. In other words, the movable contactor 102 added to the end portion of the movable contact bolt 112 moves to be separated from the fixed contactor 101 added to the end portion of the fixed contact bolt 111, so that a short circuit is not formed.

However, when a failure occurs in a sub-module, the control unit 550 detects this and controls the power source unit 540 to supply power to the coil 530. In this way, when the power is supplied to the coil 530, magnetism is induced to a soft magnetic core 520. At this point, the current direction or the winding direction is determined, so that the polarity of the magnetism induced to both end portions of the core 520 and the polarity of the permanent magnet 510 corresponding thereto are identical. In this way, as both sides show the same polarity, the already fixed core 520 pushes out the permanent magnet 510, and then the permanent magnet 510 moves toward the vacuum interrupter tube 100. According to this movement, the movable contact bolt 112 connected to the permanent magnet 510 also moves, and allows the movable contactor 102 to contact the fixed contactor 101, and the vacuum interrupter tube 100 forms a short circuit. At this point, the first and second output terminals X1 and X2 of the sub-module 10 connected to the fixed contact bolt 111 and the movable contact bolt 112 contact each other to be shorted. Here, everything from failure detection by the control unit 550 to short formation in the vacuum interrupter tube 100 takes place within several msec.

As described above, both end portions of the core 520 and the permanent magnet 510 corresponding thereto have identical polarity. To this end, the coil 530 is wound around the core 520 in a direction such that both side polarities are identical. In addition, even though the supply of power to the coil 530 is cut off after the short formation in the vacuum interrupter tube 100, the short in the vacuum interrupter tube 100 is maintained unchanged. Accordingly, the movable contactor 102 continuously contacts the fixed contactor 101 by the pressure difference between the inside and outside and the holding power of the vacuum interrupter tube 100. At this point, the pressure difference and holding power are better to be larger than the magnetic force of the permanent magnet 510, which tends to contact the core 520 again. In consideration of this, the interval between the permanent magnet 510 and the core 520 may be maintained sufficiently large and constant.

Comparing a typical technique and the present invention, in the typical technique, power is continuously supplied to the coil for maintaining a short release in the vacuum interrupter tube during normal operation. On the other hand, in the present invention, even though power is supplied to the coil only upon the occurrence of failure and after short circuit formation, since the short circuit is continuously maintained even though the power is cut off, power consumption may be reduced in comparison to the typical technique. Accordingly, for the present invention, power is momentarily necessary only at the time of the occurrence of failure, and since power is not necessary in a normal state and after bypass, it is advantageous in reducing loss of the entire system when compared to the typical technique. In addition, as an important feature, since the open state of the vacuum interrupter tube is maintained even when a converter is activated in a power failure state, it is possible to operate the converter by supplying the power from an external AC or DC circuit.

Embodiments of the present invention are described in detail, but the present invention is not limited to the embodiments. While the present invention has been particularly shown and described with reference to exemplary embodiments thereof, it will be obvious to those of ordinary skill in the art that various changes in form and details may be made therein without departing from the spirit and scope of the present invention as disclosed in the accompanying claims.

The invention claimed is:

1. A bypassing device in a converter comprising an energy storage unit and a plurality of sub-modules comprising at least one power semiconductor circuit connected to the energy storage unit in parallel and comprising a plurality of power semiconductor switches and free wheel diodes, the bypassing device comprising:

a vacuum interrupter tube shorting a first connection terminal and a second connection terminal of a sub-module by contacting a movable contact bolt to a fixed contact bolt in which a failure occurs, and bypassing a phase current from the sub-module in which the failure occurs when the failure occurs in the specific sub-module; and a control device controlling an operation of the vacuum interrupter tube, wherein the control device comprises a permanent magnet having N and S polarities at both sides respectively from the center thereof, being connected to the movable contact bolt of the vacuum interrupter tube, and moving the movable contact bolt to the fixed contact bolt of the vacuum interrupter tube so as to short the first connection terminal and the second connection terminal of the vacuum interrupter tube, a core having a C-type shape and fixedly installed to allow the N and S polarities of the permanent magnet to contact or be separated from both end portions of the C-type shaped core respectively, a coil wound on the core, a power source unit supplying power to the coil, and a control unit controlling the power supplied from the power source unit to the coil, wherein the control unit maintains a cut-off state of the power to the coil during normal operation of the sub-module so that no magnetism is generated in the core and the both sides of the permanent magnet remain in contact with the both end portions of the C-type shaped core due to magnetic forces of N and S polarities of the both sides of the permanent magnet, wherein the control unit controls the power source unit to allow power to be supplied to the coil at the time of occurrence of the failure in the sub-module so that the polarities of the both end portions of the C-type shaped core are identical to those of the both sides of the permanent magnet, the fixed core pushes out the permanent magnet with magnetism induced at the core to short the vacuum interrupter tube to bypass the phase current, and wherein even though the power to the coil is cut off after the short in the vacuum interrupter tube, the short in the vacuum interrupter tube is maintained unchanged.

2. The failure current bypassing device of claim 1, wherein the control unit performs a control to cut off the power to the coil to maintain a state where the permanent magnet contacts the core.

3. The failure current bypassing device of claim 1, wherein the coil is wound multiple times on the core in a direction such that polarities of the end portions of the core and the permanent magnet are identical.

4. The failure current bypassing device of 1, wherein a constant interval is maintained so that the permanent magnet does not contact the core after power to the coil is cut off.

* * * * *